Patented May 3, 1949

2,468,831

UNITED STATES PATENT OFFICE 2,468,831

REDUCTION OF CORROSIVE ACTION OF FRIEDEL-CRAFTS TYPE CATALYSTS

Gordon H. Miller, Port Arthur, Tex., assignor to The Texas Company, New York, N. Y., a corporation of Delaware No Drawing. Application May 22, 1945, Serial No. 595,253

5 Claims. (Cl. 260—683.5)

This invention relates to the reduction of the corrosive action of Friedel-Crafts type catalysts and particularly catalysts of this type employed in the catalytic conversion of hydrocarbons.

The invention contemplates reducing the corrosive action of catalysts of the aluminum halide-hydrocarbon complex type employed in effecting hydrocarbon conversion reactions by treating the complex catalyst with an alkaline earth metal and particularly metallic magnesium.

Aluminum halide catalysts in the form of a fluid aluminum halide-hydrocarbon complex containing unreacted aluminum halide suspended therein are useful catalysts for effecting isomerization of hydrocarbons. They are particularly effective for isomerizing normal paraffin hydrocarbons such as normal butane to produce isoparaffins. These catalysts are useful for isomerizing normally liquid hydrocarbon constituents or fractions of straight-run gasoline.

The isomerization reaction is usually carried out by passing the hydrocarbons undergoing treatment in contact with a mass of the fluid complex catalyst maintained in the presence of a promoter such as hydrogen chloride within a reaction vessel or tower. It has been found, however, that the metal surfaces of reaction vessels and auxiliary equipment fabricated from ordinary iron and steel upon exposure to contact with the catalyst under the reaction conditions usually prevailing suffer substantial corrosion. The reasons for this corrosive action and the nature of the substances in the catalyst responsible therefor are not understood. The corrosion action, however, is of such extent that frequent replacement of parts of the equipment is necessary or else resort must be had to the use of expensive alloy equipment or to the employment of other means, such as lining the equipment with ceramic or other materials.

I have discovered that these difficulties can be avoided by treating the complex catalyst with an alkaline earth metal such as magnesium so as to render it non-corrosive or substantially non-corrosive to ordinary steel such as boiler steel. For example, a sample of aluminum chloride-hydrocarbon complex catalyst used in isomerizing normal butane was placed in a beaker maintained at about 210° F. A test specimen of boiler steel was suspended in the hot complex for a period of about five hours. Thereafter the test specimen was removed and inspected to determine the loss of metal. This loss of metal, calculated on the basis of inches penetration per year, was found to be about 1.13 inches.

Another sample of this same complex catalyst was treated with powdered magnesium metal in the proportion of about 73 parts by weight of magnesium to 1460 parts of complex. The powdered metal was mixed with the complex catalyst and maintained at a temperature of about 145° F. for a period of about 130 minutes.

A test specimen was suspended in the treated complex under conditions similar to those employed in testing the untreated sample and the resulting corrosion rate was found to be equal to a penetration of about 0.06 inch per year.

From the foregoing, it is thus shown that magnesium metal is quite effective in reducing the corrosive action of the complex catalyst. It was found by contrast that aluminum metal employed under similar conditions reduced the corrosion rate to only about 50% of that exhibited by the untreated complex.

The neutralizing treatment of the complex can be carried out by subjecting the complex and treating agent to mixing in a vessel either in the presence or absence of hydrogen halide. The treatment may be carried out at a temperature ranging from 125 to 250° F. for a period of time ranging from 1 to 5 hours or more. Longer treating may be employed.

While mention has been made of employing the treating agent in the form of a powder, nevertheless it is contemplated that it may be used in other disintegrated or finely divided forms. It may be used in the form of lathe turnings.

Accordingly, the treatment of the complex may be effected by causing the complex catalyst to circulate through a treating tower or other auxiliary vessel containing a stationary mass of treating agent, the contact being effected at the proper temperature and for the necessary length of time to completely or substantially completely inhibit the corrosive action of the complex upon boiler steel. This latter method of treatment is advantageous in the usual commercial operations where the catalyst is maintained in continuous use and is fortified by the addition of fresh aluminum halide either periodically or continuously.

The complex catalyst used in isomerization of normal butane, for example, may be a preformed complex prepared by reacting anhydrous aluminum chloride with paraffinic hydrocarbons boiling in the range of gasoline and kerosene at temperatures of about 200 to 250° F. in the presence of hydrogen chloride under conditions to produce a complex characterized by having an apparent heat of hydrolysis of about 300 to 330 or 340 small calories per gram of complex, equivalent to an absolute heat of hydrolysis of about 320 to 352 or 362 small calories per gram of complex when corrected to also include the heat absorbed by the calorimeter employed in making the test. In employing such a complex for the continuous isomerization of normal butane, it is customary to fortify the catalyst by the periodic or continuous addition of a small amount of aluminum chloride. This addition is usually accomplished by dissolving a small amount of aluminum chloride in the hydrocarbon feed stream passing to the reaction vessel, or by dissolving it in a separate stream of feed hydrocarbons passing to the reaction vessel. This fortification results in the formation of complex in situ during the course of the isomerization reaction as a result of interaction between added aluminum chloride and feed hydrocarbons. The aluminum chloride addition is regulated to maintain the catalyst body within the reaction zone characterized by having a heat of hydrolysis in the foregoing range or in any other predetermined range as may be desired.

The corrosive power of complex thus formed in situ may be neutralized by contact with a neutralizing agent. The rendering of the complex liquid catalyst non-corrosive may be accomplished by continuous withdrawal of a portion of the complex catalyst from the reaction zone and passage of the withdrawn fluid through the aforesaid treating tower, following which it is recycled to the hydrocarbon reaction zone.

The aforesaid preformed complex may be prepared in the presence of a small amount of the alkaline earth metal so that a subsequent or separate neutralizing operation is avoided. The amount of magnesium metal required for this purpose will range from about 1 to 3% by weight of the complex.

While mention is made of using a complex having an apparent heat of hydrolysis ranging from about 300 to 340 calories, nevertheless it is contemplated that the heat of the hydrolysis of the particular catalyst employed may vary from this range, being either lower or higher; for example, it may range from an apparent value of about 270 to 400 calories per gram of complex catalyst, equivalent to an absolute value of about 288 to 426 calories per gram of complex.

It is contemplated that the invention may be employed for the treatment of complex catalysts of the type in question which are used in other hydrocarbon conversion reactions besides isomerization, such as alkylation and polymerization.

The complex catalysts in question may be formed as a result of interaction between the metallic halide and various types of hydrocarbons including chlorinated hydrocarbons. Besides aluminum chloride, other Friedel-Crafts metallic halides may be used such as aluminum bromide. Also, other hydrogen halide promoters besides hydrogen chloride may be used with these catalysts.

Obviously many modifications and variations of the invention as above set forth may be made without departing from the spirit and scope thereof, and therefore only such limitations should be imposed as are indicated in the appended claims.

I claim:
1. In the catalytic conversion of hydrocarbons at elevated temperature with a catalyst liquid comprising an aluminum halide-hydrocarbon complex liquid containing free aluminum halide in a reaction zone confined by a metal normally subject to substantial corrosion by the catalyst during the said conversion, the method of inhibiting said corrosion which comprises contacting said complex catalyst liquid in a separate treating zone in the absence of added hydrogen halide with free alkaline earth metal in finely-divided form at an elevated temperature and for a time sufficient to render the catalyst liquid relatively non-corrosive to boiler steel at 210° F., separating said non-corrosive complex liquid catalyst from the said metal in said treating zone, and passing said separated non-corrosive complex liquid to the said reaction zone to serve as the catalyst therein.

2. The method according to claim 1 wherein the catalyst is an aluminum chloride-paraffin hydrocarbon complex liquid containing free aluminum chloride, the alkaline earth metal is powdered magnesium, and the contacting is at a temperature within the range of about 125 to 250° F.

3. In the continuous isomerization of hydrocarbons at an elevated temperature in the presence of a catalyst liquid comprising an aluminum chloride-hydrocarbon complex liquid containing free aluminum chloride and a hydrogen chloride promoter in a reaction zone confined by a ferrous metal normally subject to substantial corrosion by the catalyst liquid during the said isomerization, the method of substantially inhibiting said corrosion which comprises continuously withdrawing a portion of the complex catalyst liquid from said isomerization reaction zone, passing said withdrawn complex liquid to a treating zone and contacting the same therein in the absence of added hydrogen chloride with free alkaline earth metal in finely-divided form at an elevated temperature and for a time sufficient to render said complex liquid substantially non-corrosive to boiler steel at 210° F., separating the non-corrosive catalyst liquid from the said metal in said treating zone, and recycling separated non-corrosive catalyst liquid to the said isomerization reaction zone.

4. The method according to claim 3, wherein the alkaline earth metal is powdered magnesium, and the said treating zone is maintained at a temperature within the range of about 125 to 250° F.

5. In the continuous isomerization of normal butane, wherein the normal butane feed is passed at an elevated temperature in contact with a body of aluminum chloride-paraffin hydrocarbon complex liquid catalyst containing free aluminum chloride in the presence of hydrogen chloride promoter in a reaction zone confined by a ferrous metal normally subject to substantial corrosion by the catalyst liquid during the said isomerization, and the complex liquid in the reaction zone is fortified by dissolving aluminum chloride in a stream of the normal butane feed passing to the reaction zone with the result that added free aluminum chloride forms with paraffin hydrocarbons additional complex liquid in situ in the reaction zone, the method of substantially inhibiting said corrosion which comprises continuously withdrawing a stream of the complex liquid catalyst from the reaction zone, treating the withdrawn stream in the absence of added hydrogen chloride with metallic magnesium in finely-divided form under conditions to render the complex liquid substantially non-corrosive to boiler steel at 210° F., separating the resulting non-corrosive catalyst liquid from the powdered magnesium in said treating zone, and recycling separated non-corrosive complex liquid to the reaction zone.

GORDON H. MILLER.

REFERENCES CITED

The following references are of record in the file of this patent:

UNITED STATES PATENTS

| Number | Name | Date |
| --- | --- | --- |
| 2,265,548 | Schult | Dec. 9, 1941 |
| 2,266,012 | D'Ouville | Dec. 16, 1941 |
| 2,271,043 | Van Peski | Jan. 27, 1942 |
| 2,299,716 | Van Peski | Oct. 20, 1942 |
| 2,382,753 | Treseder | Aug. 14, 1945 |
| 2,411,483 | Wachter et al. | Nov. 19, 1946 |